US007970527B2

(12) United States Patent
Nishi et al.

(10) Patent No.: US 7,970,527 B2
(45) Date of Patent: Jun. 28, 2011

(54) ENGINE START CONTROL APPARATUS AND ENGINE START CONTROL METHOD

(75) Inventors: Masahumi Nishi, Hyogo (JP); Itsuki Hamaue, Hyogo (JP); Yasuomi Kimura, Hyogo (JP); Norio Tsuruta, Hyogo (JP); Takeshi Sakamoto, Hyogo (JP); Yasuo Ono, Hyogo (JP)

(73) Assignee: Fujitsu Ten Limited, Kobe-shi (JP)

( * ) Notice: Subject to any disclaimer, the term of this patent is extended or adjusted under 35 U.S.C. 154(b) by 1243 days.

(21) Appl. No.: 11/260,109

(22) Filed: Oct. 28, 2005

(65) Prior Publication Data

US 2006/0095197 A1 May 4, 2006

(30) Foreign Application Priority Data

Nov. 1, 2004 (JP) ................................ 2004-317414
Feb. 4, 2005 (JP) ................................ 2005-029784

(51) Int. Cl.
*G06F 19/00* (2011.01)
*G06G 7/70* (2006.01)

(52) U.S. Cl. ............ 701/113; 701/112; 701/22; 701/29; 701/35; 701/36; 340/438

(58) Field of Classification Search .......... 701/112–113, 701/22, 29, 35, 36; 340/438
See application file for complete search history.

(56) References Cited

U.S. PATENT DOCUMENTS 6,253,127 B1 * 6/2001 Itoyama et al. ................. 701/22
6,266,596 B1 * 7/2001 Hartman et al. ................ 701/50
6,434,475 B2 * 8/2002 Kaneko et al. ................ 701/112
6,466,860 B2 * 10/2002 Kaneko ......................... 701/112
6,519,524 B2 * 2/2003 Ito ................................ 701/113
6,650,977 B2 * 11/2003 Miller ............................ 701/29
6,754,579 B2 * 6/2004 Kamiya et al. ................ 701/112
6,832,151 B2 * 12/2004 Kumazaki et al. ............ 701/112
6,972,669 B2 * 12/2005 Saito et al. .................... 340/438
7,023,332 B2 * 4/2006 Saito et al. .................... 340/438
7,117,075 B1 * 10/2006 Larschan et al. ................ 701/35
7,191,053 B2 * 3/2007 Dery ............................ 701/113
7,228,222 B2 * 6/2007 Ono ............................. 701/113
2003/0004635 A1 * 1/2003 Kamiya et al. ................ 701/112
2003/0028296 A1 * 2/2003 Miller ............................ 701/29

(Continued)

FOREIGN PATENT DOCUMENTS

JP A-08-247011 9/1996

(Continued)

OTHER PUBLICATIONS

Japanese Patent Office, *Notification of Reasons for Refusal for Japanese Patent Application No. 2004-317414*, date: Jan. 5, 2010, pp. 1-2.

(Continued)

*Primary Examiner* — Thomas G Black
*Assistant Examiner* — Wae Louie
(74) *Attorney, Agent, or Firm* — Oliff & Berridge, PLC

(57) ABSTRACT

An engine start control apparatus enables a user to start an engine of a vehicle irrespective of a user's operation of ignition key. The engine start control apparatus includes a controller that performs engine start control and a storage unit. When the engine abnormally stops during a period in which the controller performs the engine start control, the storage unit stores at least one of a cause of the abnormal stop and a timing of the abnormal stop.

4 Claims, 8 Drawing Sheets

U.S. PATENT DOCUMENTS

| | | | | |
|---|---|---|---|---|
| 2003/0135321 | A1* | 7/2003 | Kumazaki et al. | 701/112 |
| 2004/0107031 | A1* | 6/2004 | Ichikawa et al. | 701/36 |
| 2006/0095197 | A1* | 5/2006 | Nishi et al. | 701/113 |
| 2006/0247841 | A1* | 11/2006 | Ono | 701/113 |
| 2007/0038350 | A1* | 2/2007 | Larschan et al. | 701/35 |

FOREIGN PATENT DOCUMENTS

| | | |
|---|---|---|
| JP | A-08-319927 | 12/1996 |
| JP | A-09-105373 | 4/1997 |
| JP | A-09-228935 | 9/1997 |
| JP | A-10-148170 | 6/1998 |
| JP | A-10-176642 | 6/1998 |
| JP | 2006322361 A * | 11/2006 |

OTHER PUBLICATIONS

Oct. 15, 2009 Office Action for Japanese Application No. 2005-029784 (with translation).

* cited by examiner

FIG. 2

| NO. | CAUSES OF ABNORMAL STOP | NUMBER OF RESPONSES | DISPLAY PRIORITY |
|---|---|---|---|
| 1 | NO ABNORMAL STOP HAS OCCURRED IN PAST | 0 | 18 |
| 2 | BATTERY VOLTAGE IS EQUAL TO OR LESS THAN 8V | 1 | 9 |
| 3 | KSW ON | 2 | 1 |
| 4 | ANY OF DOORS IS UNLOCKED | 3 | 8 |
| 5 | REVOLUTIONS OF ENGINE ARE ABNORMAL | 4 | 13 |
| 6 | VEHICLE DISPLAY WARNING | 5 | 14 |
| 7 | ST1 TIME ELAPSES 15 SECONDS | 6 | 15 |
| 8 | INTERNAL RELAY OF ECU IS ABNORMAL | 7 | 6 |
| 9 | SECURITY WARNING (INCLUDING ENTRY DELAY) | 8 | 5 |
| 10 | ANY OF DOORS IS OPEN | 9 | 2 |
| 11 | HOOD IS OPEN | 10 | 3 |
| 12 | GEARSHIFT POSITION IS AT POSITION OTHER THAN P | 11 | 11 |
| 13 | BRAKE IS ON | 12 | 4 |
| 14 | VEHICLE HAS SPEED (VEHICLE DOES NOT STOP) | 13 | 12 |
| 15 | ACC/IG1/IG2/ST1/ST2 ON | 14 | 10 |
| 16 | DIAGNOSIS COMMUNICATION IS MADE | 15 | 7 |
| 17 | NUMBER OF TIMES ENGINE START CONTROL IS PERFORMED EXCEEDS LIMIT | 16 | 16 |
| 18 | PERIOD IN WHICH ENGINE START CONTROL IS PERFORMED EXCEEDS LIMIT | 17 | 17 |

FIG. 3

| NO. | TIMING OF ABNORMAL STOP | NUMBER OF RESPONSES |
|---|---|---|
| 1 | NO ABNORMAL STOP HAS OCCURRED IN PAST | 0 |
| 2 | ENGINE START MODE IS IN INITIAL STATE | 1 |
| 3 | ENGINE START MODE IS IN ENGINE-START BEGINNING DETERMINATION STATE | 2 |
| 4 | ENGINE START MODE IS IN AM STATE | 3 |
| 5 | ENGINE START MODE IS IN ACC STATE | 4 |
| 6 | ENGINE START MODE IS IG1 STATE | 5 |
| 7 | ENGINE START MODE IS IG2 STATE | 6 |
| 8 | ENGINE START MODE IS ACC OFF STATE | 7 |
| 9 | ENGINE START MODE IS ST2 STATE | 8 |
| 10 | ENGINE START MODE IS ST1 STATE | 9 |
| 11 | ENGINE START MODE IS ENGINE-START COMPLETION STATE | 10 |

| NO. | CAUSES OF ABNORMAL DETECTION | NUMBER OF RESPONSES |
|---|---|---|
| 1 | DETECT SHORT-CIRCUIT OF STSW CIRCUIT | 1 |
| 2 | EXCLUSIVE LINE FOR GEARSHIFT POSITION IS ABNORMAL | 2 |
| ⋮ | ⋮ | ⋮ |

(FIG. 6 CONTINUED)
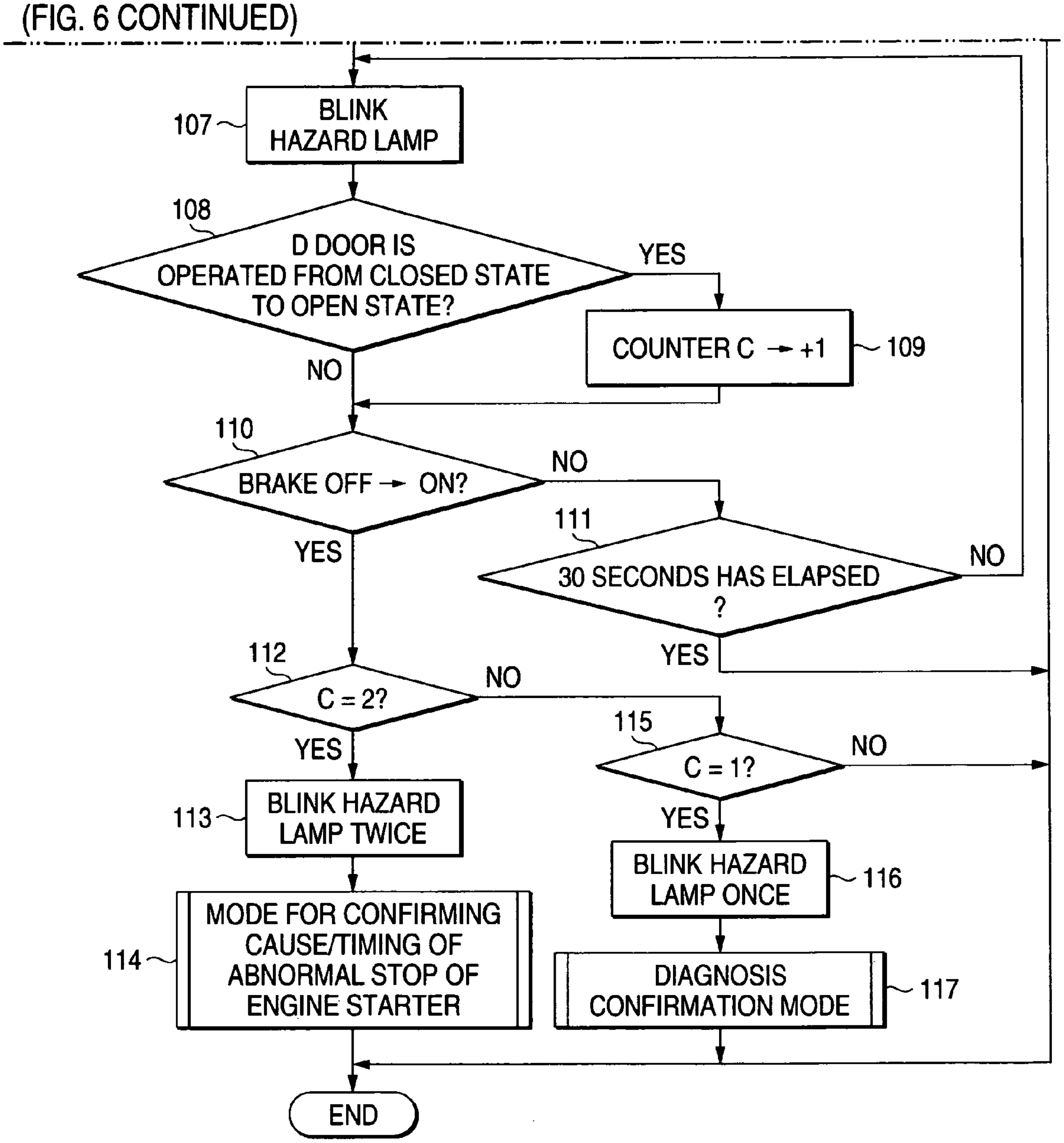

ENGINE START CONTROL APPARATUS AND ENGINE START CONTROL METHOD

This application is based upon and claims the benefit of priority from Japanese Patent Application No. 2004-317414 filed on Nov. 1, 2004 and Japanese Patent Application No. 2005-029784 filed on Feb. 4, 2005; the entire contents of which are incorporated herein by reference.

BACKGROUND OF THE INVENTION

1. Field of the Invention

The present invention relates to an engine start control apparatus and an engine start control method of controlling and starts an engine of a vehicle through a remote operation by means of a transmitter or operation by means of various switches irrespective of operation of an ignition key.

2. Description of the Related Art

In vehicles such as automobiles, a starter motor is actuated by using a battery installed in a car body as a power supply and an engine is started by cranking the engine using a rotation force generated by the starter motor. Typically, the starter motor is actuated when a driver inserts an ignition key into a keyhole of an ignition switch and turns the ignition key at a predetermined angle to thereby turn on the ignition switch. Recently, a device, which allows a driver to start an engine through a remote operation without being in the vehicle has been widely used. This device is used to start up an air conditioner before driving a vehicle in the winter or summer.

Also, a technique in which an engine starts by operating a switch without operating an ignition key has been put to practical use. For example, vehicles each having an engine starting mechanism, in which an ACC switch is turned on when a switch button is pressed once, an ignition switch is turned on when the switch button is pressed twice, and an engine starts when the switch button is pressed three times, have been sold.

On the other hand, upon receiving a start instruction from a transmitter or detecting that an engine start switch is pressed, an engine start control apparatus outputs a start instruction signal only when safety conditions are satisfied. Based on the start instruction signal, an ignition switch constituting a starting device is turned off, and a starter motor is driven to start an engine (for example, see JP Hei. 8-319927 A).

The safety conditions employed in outputting the start instruction signal include a condition that doors are closed and locked in order to prevent theft, a condition that a gearshift lever is in the parking position so that a car does not accidentally move in order to secure the safety, and/or a condition that a hood is closed in order to prevent an accident, which may occur while the hood is open for maintenance work.

SUMMARY OF THE INVENTION

As mentioned above, the engine start control apparatus outputs the start instruction signal only when the safety conditions are satisfied. If the conditions are not satisfied or any failure occurs, the engine start control stops. In this case, however, there is no means for outputting information on an abnormal stop of the engine or information on a timing at which the engine start control has stopped. Therefore, it is difficult for a user or a dealer to determine what cause the engine start control stopped due to.

In many cases, the engine start control apparatus is not normally equipped but installed as an option or mounted to a vehicle later. In this case, when the engine start control apparatus starts the engine, there is a higher probability that the engine abnormally stops due to various causes such as failures of devices, incompatibility between devices, error in mounting the engine start control apparatus, as compared with a case in which the engine start control apparatus is already installed in the vehicle as a standard equipment. Moreover, in the case in which the engine start control apparatus is optionally or additionally installed in the vehicle, a self-diagnostic function or a recording function for anomaly is not provided, so that it is difficult for the dealer to find out the causes of the abnormal stop even though a user brings a vehicle whose engine has abnormally stopped to the dealer.

In view of the above problems, the invention provides an engine start control apparatus and an engine start control method capable of simply investigating causes of abnormal stop, when the abnormal stop occurs during the engine start control.

According to one embodiment of the invention, an engine start control apparatus enables a user to start an engine of a vehicle irrespective of a user's operation of ignition key. The engine start control apparatus includes a controller and a storage unit. The controller performs engine start control. When the engine abnormally stops during a period in which the controller performs the engine start control, the storage unit stores at least one of a cause of the abnormal stop and a timing of the abnormal stop.

Here, the abnormal stop refers to any engine stops against user's intention. The cause of abnormal stop includes cause of engine stop against user's intention and cause of the fact that the engine start control apparatus stops the engine start control due to any reason during a period in which the engine start control is being performed. Also, the timing of abnormal stop refers to timing in the engine start control at which the cause of abnormal stop occurs.

According to this configuration, if the engine abnormally stops during the engine start control, since the causes/timings of the abnormal stop are stored in the storage unit, it is possible to easily determine the causes of the abnormal stops of the engine.

The engine start control apparatus may further include a notifying unit that notifies the at least one of the cause of the abnormal stop and the timing of the abnormal stop stored in the storage unit when a predetermined operation is performed.

The notifying unit may include at least one of a hazard lamp and a horn.

According to this configuration, when the predetermined operation is performed, the notifying unit (e.g., the hazard lamp and/or a horn) provided in the vehicle outputs the cause/timing of abnormal stop. Therefore, the user can see the cause of abnormal stop of the engine start control without providing another display unit.

When the notifying unit notifies the stored causes of the abnormal stop, the notifying unit may give priority to a cause of the abnormal stop with regard to which an abnormal detection is made at a higher frequency than other causes of the abnormal stop.

Priorities may be set to causes of the abnormal stop in advance. The notifying unit may notify a cause of the abnormal stop having the highest priority among the stored causes of the abnormal stop.

Furthermore, according to this configuration, when the cause of abnormal stop are output, a cause of the abnormal stop with regard to which an abnormal detection is made at a higher frequency or a cause of the abnormal stop having the highest priority is output. Therefore, the user can see a significant cause of abnormal start early.

The notifying unit may notify the timing of the abnormal stop by number of times the notifying unit outputs.

A timing of the abnormal stop, which requires larger number of times the notifying unit outputs, may be later from a beginning of the engine start control.

According to this configuration, the notifying unit notifies the timing of the abnormal stop by number of times the notifying unit outputs. Also, the user can see that a timing of the abnormal stop, which requires larger number of times the notifying unit outputs, is later from a beginning of the engine start control. Therefore, the user can easily recognize the timing of abnormal stop.

The engine start control apparatus may further includes an abnormal diagnosis unit. When the controller detects that the predetermined operation is performed, the controller may cause the notifying unit to outputs a diagnosis code detected by the abnormal diagnosis unit.

According to this configuration, since the diagnosis codes detected by the abnormal diagnosis unit are output through the notification unit by performing a predetermined operation, the user can easily see the diagnosis codes detected by the abnormal diagnosis unit without providing another display unit.

The controller may perform the engine start control in accordance with a user's operation of a transmitter to allow the user to remotely start the engine.

According to one embodiment of the invention, an engine start control method enables a user to start an engine of a vehicle irrespective of a user's operation of ignition key. The engine start control method includes: determining at least one of a cause of an abnormal stop of the engine and the abnormal stop of the engine; and storing at least one of the cause of the abnormal stop and a timing of the abnormal stop.

BRIEF DESCRIPTION OF THE DRAWINGS

FIG. 2 is a view illustrating an example of contents stored in a cause of abnormal stop of engine starter-response table.

FIG. 3 is a view illustrating an example of contents stored in a timing of abnormal stop-response table.

DETAILED DESCRIPTION OF EMBODIMENTS OF THE INVENTION

Hereinafter, an engine start control apparatus according to an embodiment of the present embodiment will be described with reference to the accompanying drawings.

Figure 1:
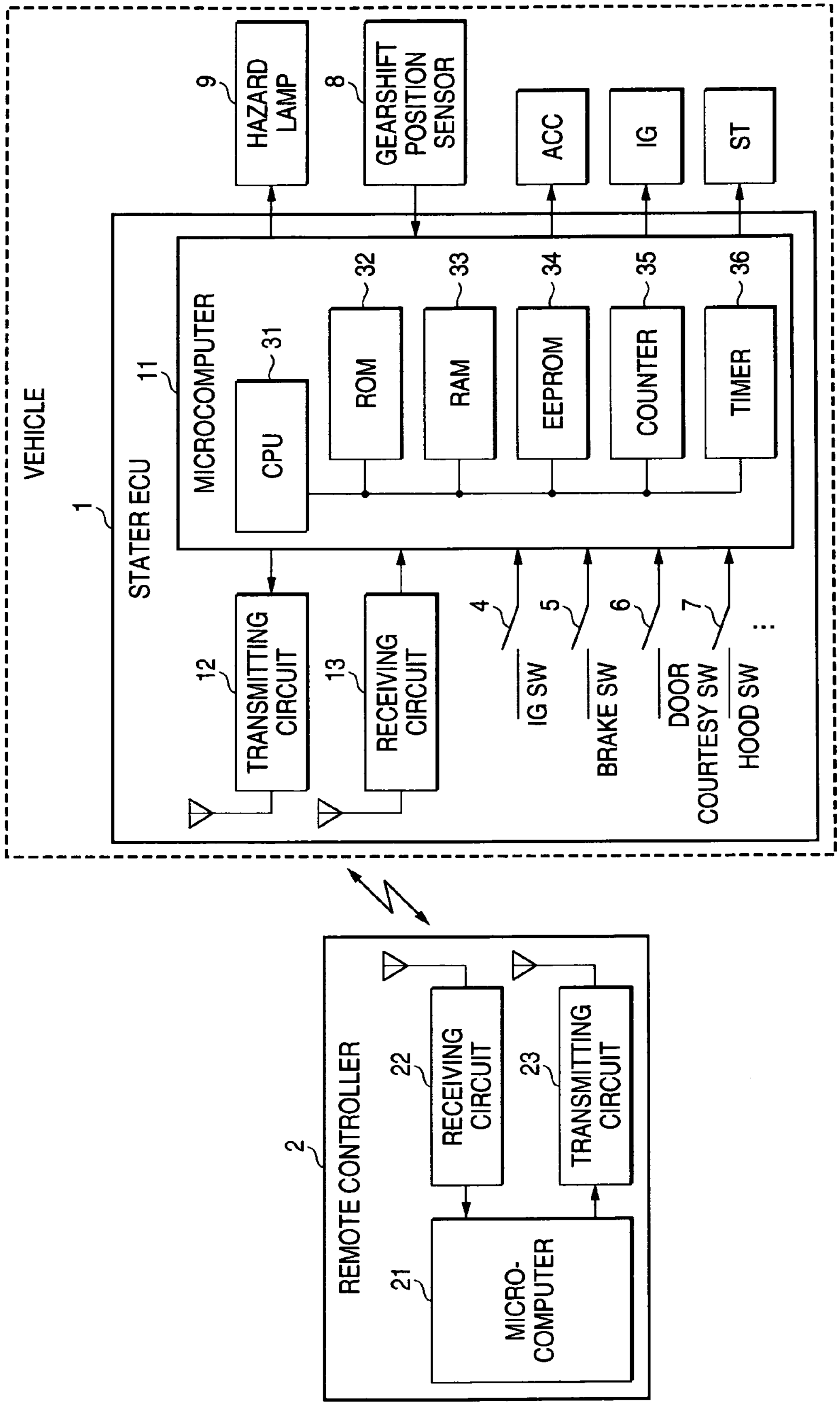
FIG. 1 is a view illustrating the configuration of an engine start control apparatus according to an embodiment of the invention.

FIG. 1 is a view illustrating the configuration of an engine start control apparatus according to an embodiment of the invention. A starter ECU 1 serving as an engine start control apparatus is an electronic control unit (ECU), which receives a start instruction from a remote controller 2 and starts an engine of a vehicle in response to the start instruction.

The remote controller 2 is portable so that a user can bring it to outside of the vehicle. The remote controller 2 includes a microcomputer 21, a receiving circuit 22 provided with an antenna, a transmitting circuit 23 provided with an antenna, and a operation button (not shown). When a request signal from the operation button or the receiving circuit 22 is input to the microcomputer 21, the microcomputer 21 is a circuit used to transmit a transmission signal including a preset ID code from the transmitting circuit 23 to the outside.

The remote controller 2 is not limited to general remote controllers. Any devices can be used as the remote controller 2 so long as a device such as a mobile phone can perform remote control.

The starter ECU 1 includes a microcomputer 11, a transmitting circuit 12 provided with an antenna, and a receiving circuit 13 provided with an antenna. The microcomputer 11 includes a CPU 31, a ROM 32 (Read Only Memory), a RAM 33 (Random Access Memory), an EEPROM 34 (Electrically Erasable Programmable Read Only Memory), a counter 35 and a timer 36. The transmitting circuit 12 converts a request signal output from the microcomputer 11 into an electromagnetic wave or a magnetic signal to output the converted signal to the outside of the vehicle compartment. The receiving circuit 13 receives an electromagnetic wave of a request signal output from the remote controller 2 to input the received request signal to the microcomputer 11.

The CPU 31 of the microcomputer 11 controls hardware parts of the microcomputer 11 and executes various programs relating to start and/or stop of an engine on the basis of programs stored in the ROM 32. In addition, the RAM 33 is constituted by a SRAM or the like and stores temporary data generated when programs are executed.

Figures 4, 5:
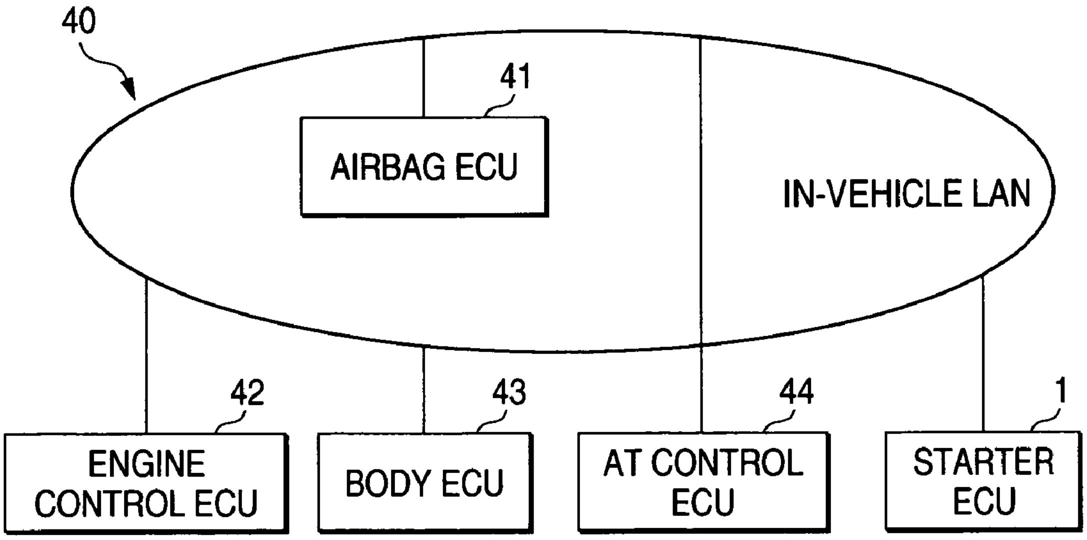
FIG. 4 is a view illustrating an example of contents stored in a diagnosis-response table.
FIG. 5 is a view illustrating an in-vehicle LAN to which a plurality of ECUs are connected.

The EEPROM 34 is an electrically writable and erasable PROM and stores a cause of abnormal stop-response table shown in FIG. 2, a timing of abnormal stop-response table shown in FIG. 3, and a diagnosis-response table shown in FIG. 4. When the engine start control stops due to any cause of the abnormal stop during the engine start control, the EEPROM 34 stores the cause of the abnormal stop, a timing of the abnormal stop and the like.

The cause of abnormal stop-response table stores numbers, causes of abnormal stops, number of responses, and display priorities as shown in FIG. 2. The numbers are assigned to the causes of the abnormal stops. The causes of the abnormal stops include "voltage of a battery being equal to or less than 8V", "KSW ON (i.e., key being inserted)" and "door being unlocked". When each cause of the abnormal stop occurs, a response is made (e.g., hazard lamp is blinked) in accordance with the number of responses. The display priorities are set in order of descending frequencies at which abnormal detection is performed about each cause of the engine stop. As shown in FIG. 3, in the timing of abnormal stop-response table stores: numbers assigned to timings, at which the abnormal engine stop occurs, at various stages during the engine start control; and number of responses in accordance with the timings. As shown in FIG. 4, the diagnosis-response table stores numbers assigned to the causes of abnormal detection, which is detected by the diagnosis detection function, and number of responses, which are made when respective abnormal detections are detected. The causes of the abnormal detections include that "short-circuit of a start switch circuit is detected" and/or that "an exclusive line for a gearshift position is abnormal".

In addition, the counter 35 and the timer 36 perform a counting process and a timing process, respectively. The counter 35 and the timer 36 may be constituted by hardware, but alternatively, those functions may be performed through software by using the CPU 31, the ROM 32 and the RAM 33.

On the other hand, various switches and sensors including an IGSW 4, a brake switch (SW) 5, a door courtesy switch (SW) 6, a hood switch 7 and a gearshift position sensor 8 are connected to the starter ECU 1. The IG SW 4 detects a switching state of an ignition switch. The brake switch (SW) 5 detects a operation state of a brake. The door courtesy switch (SW) 6 detects an open/closed state of doors. The hood switch (SW) 7 detects an open/closed state of a hood. The gearshift position sensor 8 detects whether or not a gearshift lever of an automatic transmission of an automatic car is in a parking position. Further, as shown in FIG. 5, the starter ECU 1 is connected to other vehicle control units (ECUs), for example, an airbag ECU 41, an engine control ECU 42, a body ECU 43, an AT control ECU 44, through an in-vehicle LAN 40. The starter ECU 1 receives a vehicle speed signal, an engine rotation signal, a security signal and/or a diagnosis communication signal from these ECUs.

Further, the starter ECU 1 outputs a notification driving signal, such as a lamp driving signal, to a notifying unit, such as a hazard lamp 9 and a horn (not shown). The starter ECU 1 starts the engine by sequentially outputting an ACC output, an IG output, and an ST output. The ACC output is output to an ACC relay (not shown) for supplying power to an ACC circuit of the vehicle. The IG output is output to an IG relay (not shown) for supplying power to an ignition circuit of the vehicle. The ST output is output to a starter activation relay (not shown) for driving a starter motor to start the engine.

Furthermore, upon receiving an engine start instruction from the remote controller 2 through the receiving circuit 13, the microcomputer 11 determines whether or not the vehicle is in a safe condition on the basis of outputs of the various switches and sensors such as the door courtesy SW 6, the hood SW 7, and the gearshift position sensor 8. At the same time, the microcomputer 11 determines whether or not the vehicle is in a failure condition. If the microcomputer 11 determines that the vehicle is in the safe condition but is not in the failure condition, the microcomputer 11 starts the engine by turning on the ACC output and the IG output and turning on the ST output for a predetermined period.

More specifically, upon receiving the engine start instruction, the CPU 31 of the microcomputer 11 determines whether or not the engine is in a startable condition. If the CPU 31 determines that the engine is in the startable condition, the CPU 31 turns on the ACC output, and then turns on the IG output to thereby supply power to the ignition circuit. Then, after a predetermined period elapses, the CPU 31 turns on the ST output, and simultaneously turns off the ACC output. Further, when the starter motor is driven to start the engine, the CPU 31 turns off the ST output to stop the driving of the starter motor, and maintains an engine operating state.

On the other hand, if the engine starting has not been detected even when the starter motor has been driven for the predetermined period, the CPU 31 stops the ST output and restarts the engine after a predetermined period elapses. In addition, if the engine fails to start predetermined number of times, the CPU 31 presumes that it is difficult to start the engine due to due to any abnormality in the engine. Accordingly, the CPU 31 stops subsequent engine start operations.

In the case where during a period in which the engine start control is being performed, the engine start control stops due to any abnormal stop cause, for example, "hood being open", "diagnosis communication being made", or "ST being output for the predetermined period", number of the cause of the abnormal stop is stored in the EEPROM 34. At the same time, a timing at which the engine has abnormally stopped, for example "engine start determination state" and "ACC state", are determined and number of the timing of the abnormal stop is stored in the EEPROM 34 as well.

On the other hand, ECUs for controlling a vehicle may cause a problem in running the vehicle if abnormality detection operations for the respective parts of the ECUs are not performed, and in some cases, the vehicle may not run. Therefore, the ECUs are provided with a self-diagnosis function so as to improve the reliability of the ECUs. Accordingly, the starter ECU 1 also performs a diagnosis process. The diagnosis process includes automatically checking the operation state of a CPU or various sensors periodically. The diagnosis process also includes lighting an abnormality lamp or storing abnormality codes (DTC: Diagnosis Trouble Code) when a vehicle is broken down so that a repairman can see the cause of failure of the vehicle. In addition, when the failure is detected, the number of the abnormality code is stored in the EEPROM 34.

Further, if an abnormal stop occurs when the engine start control apparatus starts the engine, a user brings the vehicle to a dealer and requests the dealer to check the vehicle. An inspector such as the dealer detects the cause of the abnormal stop. Operation of the microcomputer 11 in this case will be described with reference to flowcharts shown in FIGS. 6 to 8.

In the following description, a program is designed so as to make the transition to a flow of instructing a confirmation mode when the inspector brings the vehicle into an initial state, operates a passenger seat door from a closed state to an open state twice within five seconds, and then operates a brake from an OFF state to an ON state five times. In the flow of instructing the confirmation mode, the program further makes the transition to respective confirmation modes in accordance with number of times the inspector operates a driver seat door from a close state to an open state.

Figure 6:
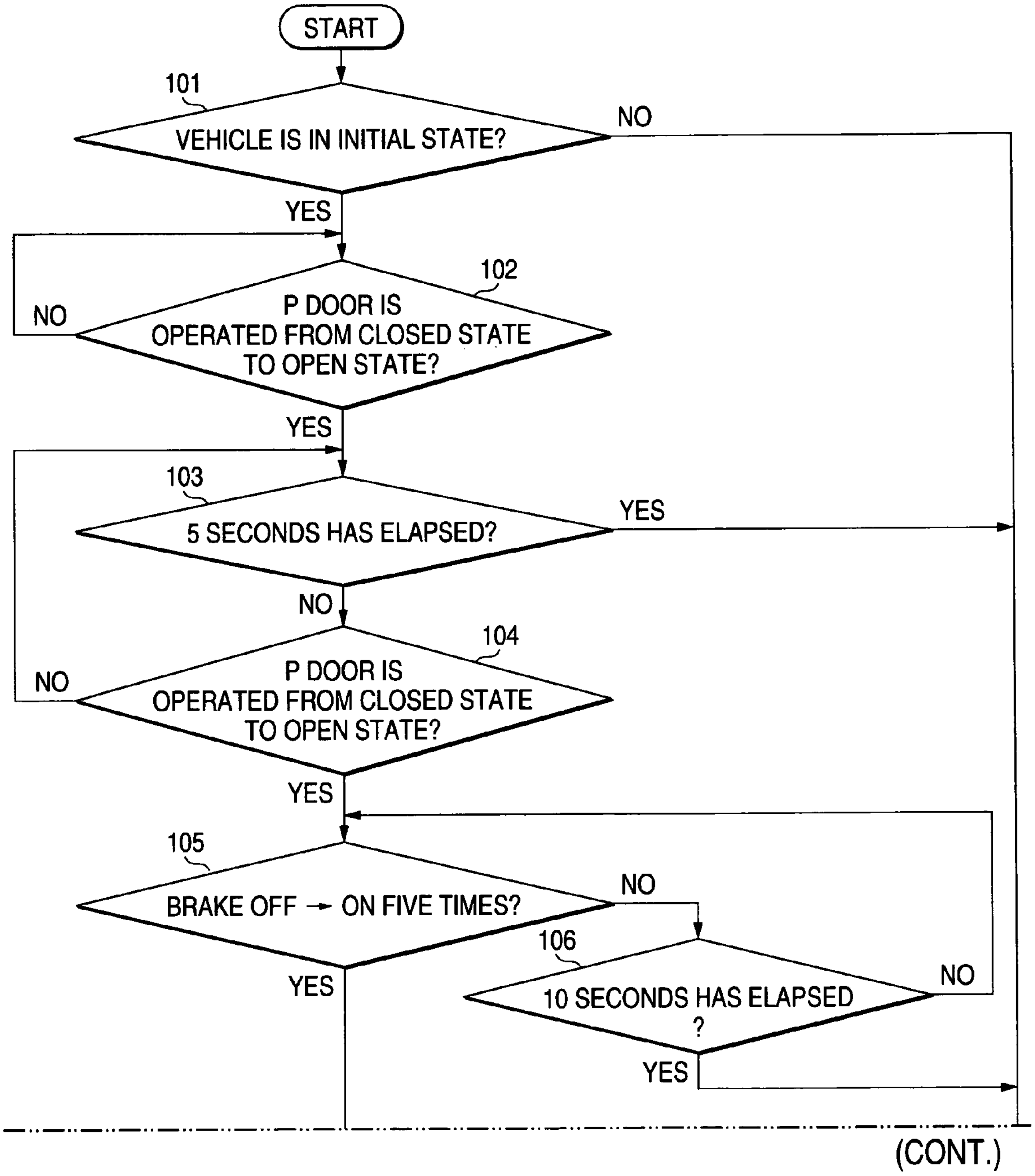
FIG. 6 is a flowchart illustrating operation of an engine start control apparatus when cause of abnormal stop is notified.

The CPU 31 of the microcomputer 11 always runs a program for notifying a cause of engine stop shown in the flow chart of FIG. 6. When this program starts, the CPU 31 first determines whether or not the vehicle is in an initial state (step 101). More specifically, the CPU 31 determines whether or not satisfied are conditions that "engine stops", that "IG, ACC are off", that "brake is off", that "hood is closed", that "a gearshift lever is at the P range", and that "all doors are closed" from outputs of the IG SW 4, the brake SW 5, the door courtesy SW 6, the hood SW 7 and the gearshift position sensor 8. Then, when all the conditions are satisfied, the CPU 31 determines that the vehicle is in the initial state.

In step 101, if the CPU 31 determines that the vehicle is not in the initial state, the CPU 31 terminates the program. If the CPU 31 determines that the vehicle is in the initial state, then the CPU 31 determines whether or not the passenger seat door is operated from the closed state to the open state (step 102). When the inspector opens the passenger seat door, the CPU 31 detects that the passenger seat door is open from the output of the door courtesy SW 6. Then, the CPU 31 determines, through timing measured by the timer 36, whether or not five seconds has elapsed since the passenger seat door was opened (step 103). If the CPU 31 determines that five seconds has not elapsed yet since the passenger seat door was opened, the CPU 31 determines whether or not the passenger seat door is operated again from the closed state to the open state (step 104).

Thereafter, if the CPU 31 determines that the passenger seat door has not been operated from the closed state to the open state in step 104, the program returns to step 103 where the CPU 31 again determines whether or not five seconds has elapsed since the passenger seat door was opened. If the CPU 31 determines that five seconds has elapsed, that is, if the inspector opens the passenger seat door but does not closes the passenger seat door within five seconds after he opened it, the CPU 31 terminates the program.

On the other hand, if the CPU 31 determines that the passenger seat door is operated again from the closed state to the open state in step 104, the CPU 31 determines from the output of the brake SW 5 whether or not the brake has been operated from an OFF state to an ON state five times (step 105). If the CPU 31 determines that the brake has not been operated five times (No at step 105), the CPU 31 determines, through timing of the timer 36, whether or not ten seconds has elapsed since the passenger seat door was operated from the closed state to the open state at the second time (step 106). If the CPU 31 determines that ten seconds has not elapsed (No at step 106), the program returns to step 105. If the CPU 31 determines that ten seconds has elapsed (Yes at step 106), that is, if the inspector does not operate the brake from the OFF state to the ON state within ten seconds after he opened the passenger seat door at the second time, the CPU 31 terminates the program.

On the other hand, if the inspector operates the brake from the OFF state to the ON state five times within ten seconds and the CPU 31 detects this inspector's operation at step 105 (Yes at step 05), the CPU 31 blinks the hazard lamp 9 once (step 107). Thereby, the inspector can see that the program for notifying a cause of engine stop is being executed.

Next, the CPU 31 determines whether or not the driver seat door is operated from a closed state to an open state (step 108). If the CPU 31 determines that the driver seat door is operated from the closed state to the open state (Yes at step 108), the CPU 31 increments a count value C of the counter 35 by one (step 109). On the contrary, if the CPU 31 determines that the driver seat door is not operated from the closed state to the open state (No at step 108) or if the CPU 31 increments the count value C at step 109, then the CPU 31 determines whether or not the brake is operated from the OFF state to the ON state (step 110). If the CPU 31 determines that the brake is not operated from the OFF state to the ON state (No at step 110), the CPU 31 determines, through timing measured by the timer 36, whether 30 seconds has elapsed since the hazard lamp 9 was first turned on (step 111).

Subsequently, if the CPU 31 determines that 30 seconds has not elapsed (No at step 111), the program returns to step 107 where the CPU 31 blinks the hazard lamp 9 again. On the contrary, if the CPU 31 determines that 30 seconds has elapsed (Yes at step 111), the CPU 31 terminates the program.

On the other hand, if the inspector operates the brake from the OFF state to the ON state and the CPU 31 detects this inspector's operation (Yes at step 110), the CPU 31 determines whether or not the count value C of the counter 35 is equal to two (step 112). If the CPU 31 determines that the count value C is equal to two (Yes at step 112), the CPU 31 blinks the hazard lamp 9 twice (step 113). Thereby, the inspector is informed of transition to a mode for confirming cause/timing of abnormal stop of the engine starter. Then, the CPU 31 enters into the mode for confirming cause/timing of abnormal stop of the engine starter (step 114).

On the other hand, if the CPU 31 determines that the count value C of the counter 35 is not equal to two (No at step 112), the CPU 31 determines whether or not the count value C of the counter 35 is equal to one (step 115). If the CPU 31 determines that the count value C is not equal to one (No at step 115), the CPU 31 terminates the program. On the contrary, if the CPU 31 determines that the count value C is equal to one (Yes at step 115), the CPU 31 blinks the hazard lamp 9 once (step 116). Thereby, the inspector is informed of transition to a diagnosis confirmation mode. Then, the CPU 31 enters into the diagnosis confirmation mode (step 117).

As described above, when the inspector operates the brake from the OFF state to the ON state five times within ten seconds after operating the passenger seat door from the closed state to the open state twice within five seconds, the CPU 31 makes the transition to the flow of instructing a confirmation mode (e.g., a mode for confirming a cause of abnormal stop of the engine starter. Furthermore, the CPU 31 enters into the mode for confirming cause/timing of abnormal stop of the engine starter or the diagnosis confirmation mode in accordance with the number of times the driver seat door is operated from the closed state to the open state before the brake is operated from the OFF state to the ON state within 30 seconds.

Figure 7:
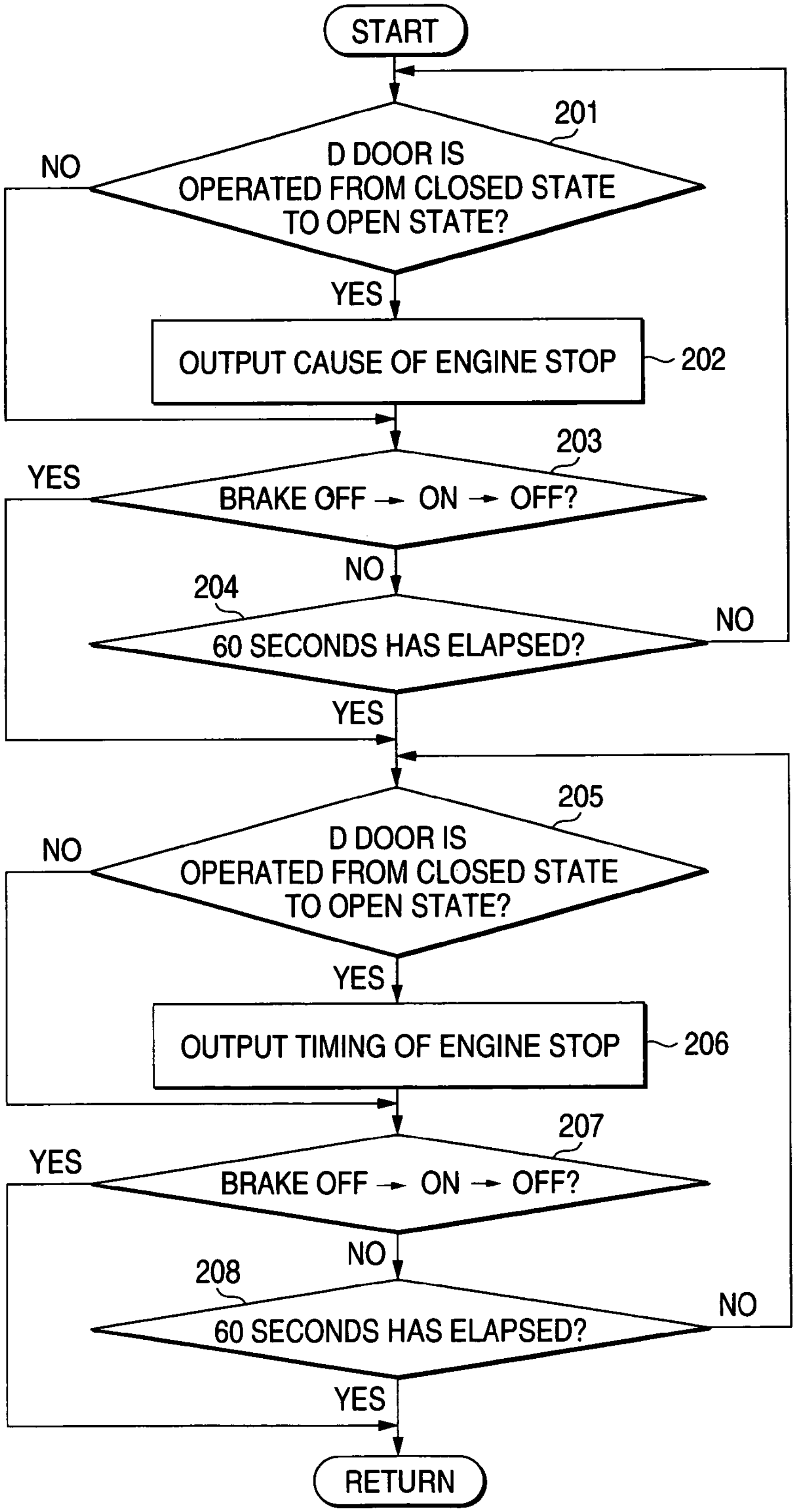
FIG. 7 is a sub-flowchart illustrating operation of the engine start control apparatus in a mode for confirming cause/timing of abnormal stop of the engine starter.

Next, operation of the microcomputer 11 in the mode for confirming cause/timing of abnormal stop of the engine starter will be described with reference to a sub-flowchart of FIG. 7.

When the mode for confirming cause/timing of abnormal stop of the engine starter starts, the CPU 31 of the microcomputer 11 determines whether or not the inspector operates the driver seat door from a closed state to an open state (step 201). If the CPU 31 determines that the inspector operates the driver seat door from the closed state to the open state (Yes at step 201), cause of the abnormal stop is output (step 202).

More specifically, the CPU 31 extracts from the EEPROM 34 the stored number of the cause of the abnormal stop, which occurred during the engine start control. The CPU 31 detects the number of responses associated with the extracted cause of the abnormal stop by referring to the cause of abnormal stop-response table shown in FIG. 2, which is stored in the EEPROM 34. Then, the CPU 31 blinks the hazard lamp 9 as many as the detected number of responses. Thereby, the inspector can easily see the cause of the abnormal stop by counting the number of times the hazard lamp 9 blinks.

Further, if a plurality of causes of abnormal stop occurs during the engine start control, the blinking control of the hazard lamp is performed plural times sequentially at predetermined intervals, starting from a cause of abnormal stop having high priority, that is, from a cause of abnormal stop having low number in the table, on the basis of the display priority order of the cause of abnormal stop-response table. Accordingly, the inspector can see cause of the abnormal stop sequentially from the cause with regard to which abnormal detection determination is made at high frequency.

Furthermore, when the output of the cause of the engine stop ends at step 202 or if the CPU 31 determines that the inspector does not operate the driver seat door from the closed state to the open state (No at step 201), the CPU 31 determines whether or not the inspector operates the brake from the OFF state, through the ON state, to the OFF state. If the CPU 31 determines that the inspector does not operate the brake from the OFF state, through the ON state, to the OFF state (No at step 203), the CPU 31 determines, through timing measured by the timer 36, whether or not 60 seconds has elapsed since the mode for confirming cause/timing of abnormal stop started. If the CPU 31 determines that 60 seconds has not elapsed (No at step 204), the program returns to step 201.

On the other hand, if the CPU 31 determines that the inspector operates the brake from the OFF state, through the ON state, to the OFF state (Yes at step 203) or if the CPU 31 determines that 60 seconds has elapsed (Yes at step 204), the CPU 31 proceeds to step 205 and terminates the flow of outputting cause of engine stop.

Accordingly, the inspector can cause the starter ECU 1 to output cause of engine stop as many time as he/she wants, by operating the driver seat door from the closed state to the open state within 60 seconds since the mode for confirming cause/timing of abnormal stop started. Therefore, the inspector can reliably confirm cause of the engine stop. In addition, after the inspector confirms cause of the engine stop, the CPU 31 can enter into the flow of outputting timing of abnormal stop at any time when the inspector operates the brake from the OFF state, through the ON state, to the OFF state.

Upon entering into the flow of outputting timing of abnormal stop, the CPU 31 determines again whether or not the inspector operates the driver seat door from the closed state to the open state (step 205). If the CPU 31 determines that the inspector operates the driver seat door from the closed state to the open state (Yes at step 205), timing of abnormal stop is output (step 206).

More specifically, the CPU 31 extracts from the EEPROM 34 the stored number of the timing at which the engine has abnormally stopped during the engine start control. The CPU 31 detects the number of responses associated with the extracted timing of abnormal stop by referring to the timing of abnormal stop-response table shown in FIG. 3. Then, the CPU 31 blinks the hazard lamp 9 as many as the extracted number of responses. Accordingly, the inspector can easily see timing of abnormal stop by counting the number of times the hazard lamp 9 blinks. In addition, as shown in the table of FIG. 3, timing of abnormal stop, which requires larger number of times the hazard lamp 9 blinks, is later from the beginning of the engine start control. Therefore, the inspector can sensuously see the abnormal stop timing.

In addition, when the output of the timing of abnormal stop ends at step 206 or if the CPU 31 determines that the inspector does not operate the driver seat door from the closed state to the open state (No at step 205), the CPU 31 determines whether or not the inspector operates the brake from the OFF state, through the ON state, to the OFF state (step 207). If the CPU 31 determines that the inspector does not operate the brake from the OFF state, through the ON state, to the OFF state (No at step 207), the CPU 31 determines, through timing measured by the timer 36, whether or not 60 seconds has elapsed since the flow of outputting timing of abnormal stop started (step 208). If the CPU 31 determines that 60 seconds has not elapsed (No at step 208), the CPU 31 returns to step 205.

On the other hand, if the CPU 31 determines that the inspector does not operate the brake from the OFF state, through the ON state, to the OFF state (No at step 207) or if the CPU 31 determines that 60 seconds has elapsed (Yes at step 208), the CPU 31 terminates the mode for confirming cause/timing of abnormal stop and returns to the flowchart of FIG. 6.

Accordingly, the inspector can cause the starter ECU 1 to output timing of engine stop as many as he/she wants, by operating the driver seat door from the closed state to the open state within 60 seconds since the CPU 31 entered into the flow of outputting timing of abnormal stop. Therefore, the inspector can reliably confirm timing of abnormal stop. Moreover, after the inspector confirms the timing of abnormal stop, the CPU 31 can terminate the mode for confirming cause/timing of abnormal stop at any time when the inspector operates the brake from the OFF state, through the ON state, to the OFF state of the brake. Therefore, time taken to check the conditions of a vehicle can be shortened.

Figure 8:
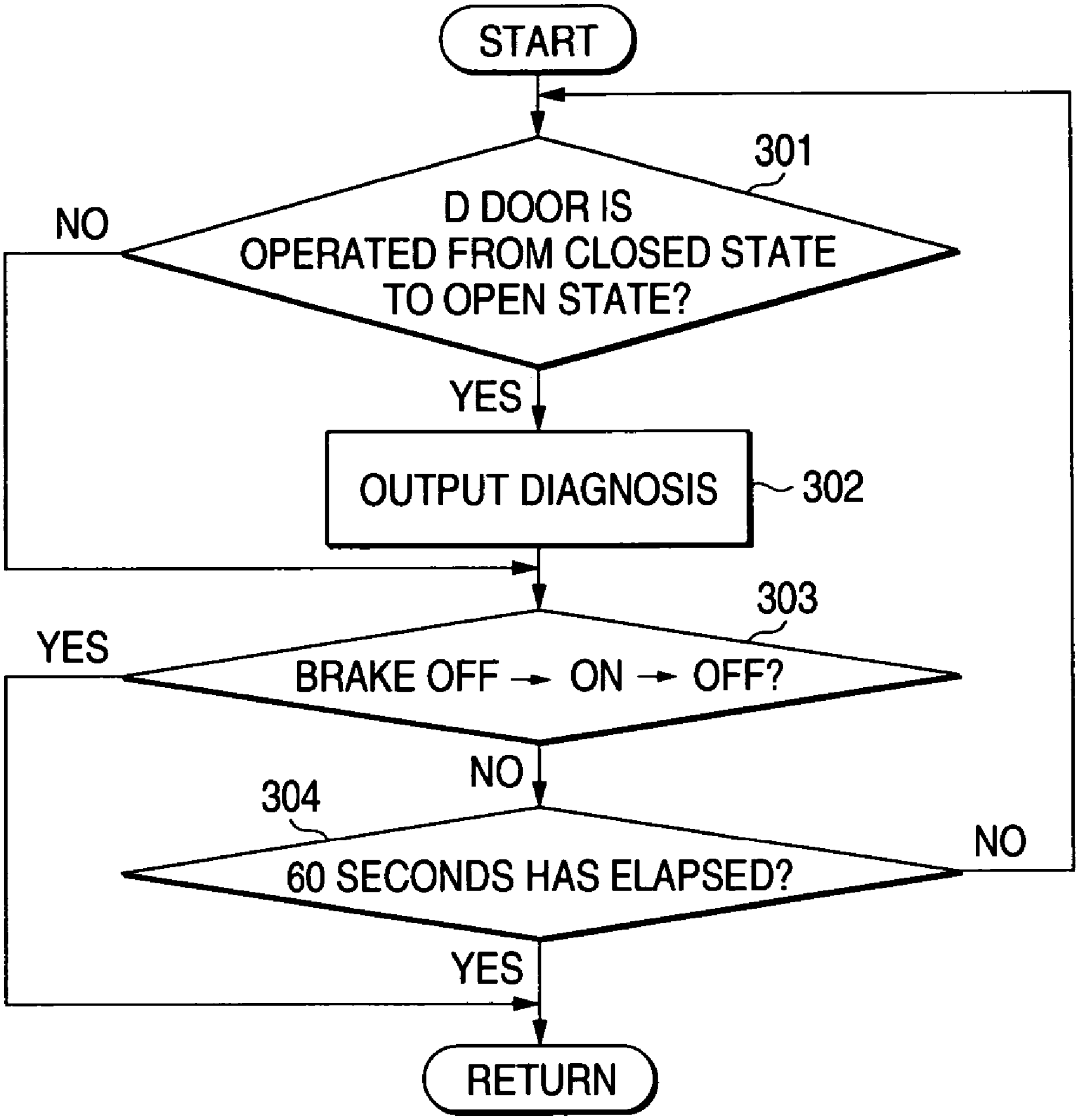
FIG. 8 is a sub-flowchart illustrating operation of an engine start control apparatus in a diagnosis confirmation mode.

Next, operation of the microcomputer 11 in the diagnosis confirmation mode will be described with reference to a sub-flowchart of FIG. 8.

When the diagnosis confirmation mode starts, the CPU 31 of the microcomputer 11 determines whether or not the inspector operates the driver seat door from a closed state to an open state (step 301). If the CPU 31 determines that the inspector operates the driver seat door from the closed state to the open state (Yes at step 301), a diagnosis output is performed (step 302).

More specifically, the CPU 31 extracts from the EEPROM 34 the stored number of cause of abnormal detection. The CPU 31 detects the number of responses associated with the extracted cause of abnormality detection by referring to the diagnosis-response table shown in FIG. 4, which is stored in the EEPROM 34. Then, the CPU 31 blinks the hazard lamp 9 as many as the number of responses. Accordingly, the inspector can easily see a diagnosis code, that is, the cause of abnormality detection, by counting the number of times the hazard lamp 9 blinks.

Further, when the diagnosis output ends at step 302 or if the CPU 31 determines that the inspector does not operate the driver seat door from the closed state to the open state (No at step 301), the CPU 31 determines whether or not the inspector operates the brake from the OFF state, through the ON state, to the OFF state (step 303). If the CPU 31 determines that the inspector does not operate the brake from the OFF state, through the ON state, to the OFF state of the brake (No at step 303), the CPU 31 determines, through timing measured by the timer 36, whether or not 60 seconds has elapsed since the diagnosis confirmation mode started (step 304). If the CPU 31 determines that 60 seconds has not elapsed (No at step 304), the CPU 31 returns to step 301.

On the other hand, if the CPU 31 determines that the inspector operated the brake from the OFF state, through the ON state, to the OFF state (Yes at step 303) or if the CPU 31 determines that 60 seconds has elapsed (Yes at step 304), the CPU 31 terminates the diagnosis confirmation mode and returns to the flowchart of FIG. 6.

Accordingly, as described above, the inspector can cause the starter ECU 1 to output the diagnosis code as many times as he/she wants, by operating the driver seat door from the closed state to the open state within 60 seconds since the CPU 31 entered into the diagnosis confirmation mode. Therefore, the inspector can reliably confirm cause of abnormality detection. In addition, after the inspector confirms cause of abnormality detection, the CPU 31 can terminate the diagnosis confirmation mode at any time when the inspector operates the brake from the OFF state, through the ON state, to the OFF state. Accordingly, time taken to check the conditions of a vehicle can be shortened.

In the above embodiment, an example where the engine start control is performed in response to the start instruction from the transmitter is described. The invention may also be applied to an engine start control apparatus, which performs the engine start control in response to a user's operation of a switch.

Also, in the above embodiment, cause of abnormal stop, timing of abnormal stop and cause of abnormal detection are notified by means of the number of times a hazard lamp blinks. However, the invention is not limited thereto. Cause/timing of abnormal stop and cause of abnormal detection may be notified by means of number of times another lamp blinks or number of timing a buzzer sounds.

Also, in the above embodiment, the program for notifying cause of abnormal stop or the like proceeds in response to opening/closing of a door and an operation of a brake. However, the invention is not limited thereto. In response to an operation of another vehicle device (e.g., turning on/off of an interior lamp, opening/closing of a window, and earthing/opening an exclusive terminal provided in the starter ECU 1), the program may enter into the flow of instructing a confirmation mode (e.g., a mode for confirming cause of abnormal stop of engine start control), make the transition into the respective confirmation modes, and/or output cause/timing of abnormal stop.

While a number of exemplary aspects and embodiments have been discussed above, those of skill in the art will recognize certain modifications, permutations, additions and sub-combinations thereof. It is therefore intended that the following appended claims and claims hereinafter introduced are interpreted to include all such modifications, permutations, additions and sub-combinations as are within the true spirit and scope.

FIG. 1

1: STARTER ECU
2: REMOTE CONTROLLER
5: BRAKE SW
6: DOOR COURTESY SW
7: HOOD SW
8: GEARSHIFT POSITION SENSOR
9: HAZARD LAMP
11: MICROCOMPUTER
12: TRANSMITTING CIRCUIT
13: RECEIVING CIRCUIT
21: MICROCOMPUTER
22: RECEIVING CIRCUIT
23: TRANSMITTING CIRCUIT
35: COUNTER
35: TIMER

FIG. 2

(A) CAUSES OF ABNORMAL STOP
(B) THE NUMBER OF RESPONSES
(C) DISPLAY PRIORITY
(D) NO ABNORMAL STOP HAS OCCURRED IN PAST
(E) BATTERY VOLTAGE IS EQUAL TO OR LESS THAN 8V
(F) ANY OF DOORS IS UNLOCKED
(G) REVOLUTIONS OF ENGINE ARE ABNORMAL
(H) VEHICLE DISPLAY WARNING
(I) ST1 TIME ELAPSES 15 SECONDS
(J) INTERNAL RELAY OF ECU IS ABNORMAL
(K) SECURITY WARNING (INCLUDING ENTRY DELAY)
(L) ANY OF DOORS IS OPEN
(M) HOOD IS OPEN
(N) GEARSHIFT POSITION IS AT POSITION OTHER THAN P
(O) BRAKE IS ON
(P) VEHICLE HAS SPEED (VEHICLE DOES NOT STOP)
(Q) DIAGNOSIS COMMUNICATION IS MADE
(R) NUMBERS OF TIMES ENGINE START CONTROL IS PERFORMED EXCEEDS LIMIT
(S) PERIOD IN WHICH ENGINE START CONTROL IS PERFORMED EXCEEDS LIMIT

FIG. 3

(A) TIMING OF ABNORMAL STOP
(B) NUMBER OF RESPONSES
(C) NO ABNORMAL STOP HAS OCCURRED IN PAST
(D) ENGINE START MODE IS IN INITIAL STATE
(E) ENGINE START MODE IS IN ENGINE-START BEGINNING DETERMINATION STATE
(F) ENGINE START MODE IS IN AM STATE
(G) ENGINE START MODE IS IN ACC STATE
(H) ENGINE START MODE IS IG1 STATE
(I) ENGINE START MODE IS IG2 STATE
(J) ENGINE START MODE IS ACC OFF STATE
(K) ENGINE START MODE IS ST2 STATE
(L) ENGINE START MODE IS ST1 STATE
(M) ENGINE START MODE IS ENGINE-START COMPLETION STATE

FIG. 4

(A) CAUSES OF ABNORMAL DETECTION
(B) NUMBERS OF RESPONSES
(C) DETECT SHORT-CIRCUIT OF STSW CIRCUIT
(D) EXCLUSIVE LINE FOR GEARSHIFT POSITION IS ABNORMAL

FIG. 5

40: IN-VEHICLE LAN
41: AIRBAG ECU
42: ENGINE CONTROL ECU
43: BODY ECU
44: AT CONTROL ECU
1: STARTER ECU

FIG. 6

101: IS VEHICLE IN INITIAL STATE?
102: IS P DOOR OPERATED FROM CLOSED STATE TO OPEN STATE?
103: HAS 5 SECONDS ELAPSED?
104: IS P DOOR OPERATED FROM CLOSED STATE TO OPEN STATE?
105: BRAKE OFF→ON FIVE TIMES?
106: HAS TEN SECONDS ELAPSED?
107: BLINK HAZARD LAMP
108: IS D DOOR OPERATED FROM CLOSED STATE TO OPEN STATE?
109: COUNTER c→+1
110: BRAKE OFF→ON?
111: HAS 30 SECONDS ELAPSED?
112: C=2?
113: BLINK HAZARD LAMP TWICE
114: MODE FOR CONFIRMING CAUSE/TIMING OF ABNORMAL STOP OF ENGINE STARTER
115: C=1?
116: BLINK ON HAZARD LAMP ONCE
117: DIAGNOSIS CONFIRMATION MODE

FIG. 7

201: IS D DOOR OPERATED FROM CLOSED STATE TO OPEN STATE?
202: OUTPUT CAUSE OF ENGINE STOP
203: BRAKE OFF→ON→OFF?
204: HAS 60 SECONDS ELAPSED?
205: IS D DOOR OPERATED FROM CLOSED STATE TO OPEN STATE?
206: OUTPUT TIMING OF ENGINE STOP
207: BRAKE OFF→ON→OFF?
208: HAS 60 SECONDS ELAPSED?

FIG. 8

301: IS D DOOR OPERATED FROM CLOSED STATE TO OPEN STATE?
302: OUTPUT DIAGNOSIS
303: BRAKE OFF→ON→OFF?
304: HAS 60 SECONDS ELAPSED?

What is claimed is:

1. An engine start control apparatus for enabling a user to start an engine of a vehicle irrespective of a user's operation of an ignition key, the apparatus comprising:

a controller that performs an engine start control;

a storage unit that stores a timing of an occurrence of a cause of an abnormal stop during the engine start control when the engine abnormally stops during a period in which the controller performs the engine start control; and a notifying unit that notifies a content of the cause of the abnormal stop during the engine start control.

2. The engine start control apparatus according to claim 1, wherein the notifying unit notifies the timing of the occurrence of the cause of the abnormal stop during the engine start control when a predetermined operation is performed.

3. The engine start control apparatus according to claim 2, wherein the notifying unit is comprised of one of a lamp and a horn, wherein the notifying unit notifies the timing of the occurrence of the cause of the abnormal stop during the engine start control by the number of times the lamp lights up or the number of times the horn sounds, and wherein the number of times the lamp lights up or the number of times the horn sounds increases as the cause of the abnormal stop occurs later.

4. The engine start control apparatus according to claim 1, wherein the controller performs the engine start control in accordance with a user's operation of a transmitter to allow the user to remotely start the engine.

* * * * *